Oct. 7, 1941.　　　M. P. SIEGER　　　2,258,339
RECIPROCATING SHEAR
Filed Aug. 3, 1940　　　5 Sheets-Sheet 3
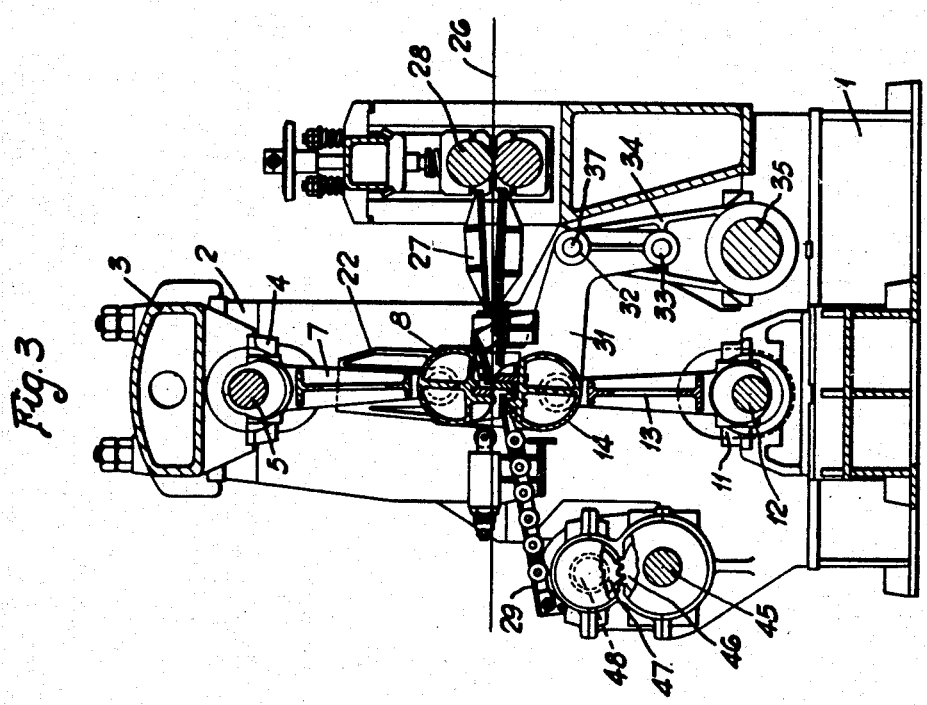
INVENTOR
Maurice P. Sieger
BY J. E. Dickinson
ATTORNEY

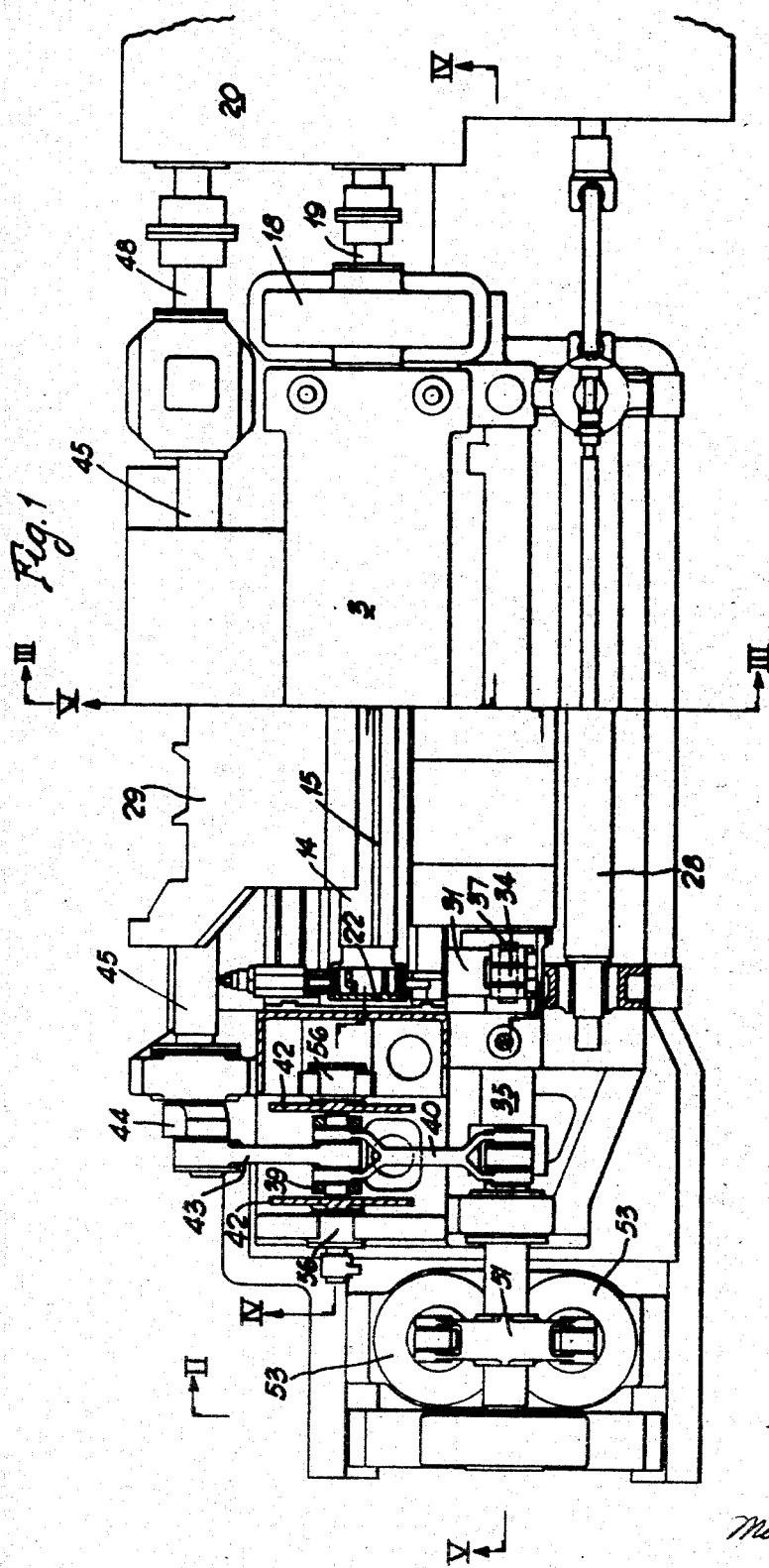

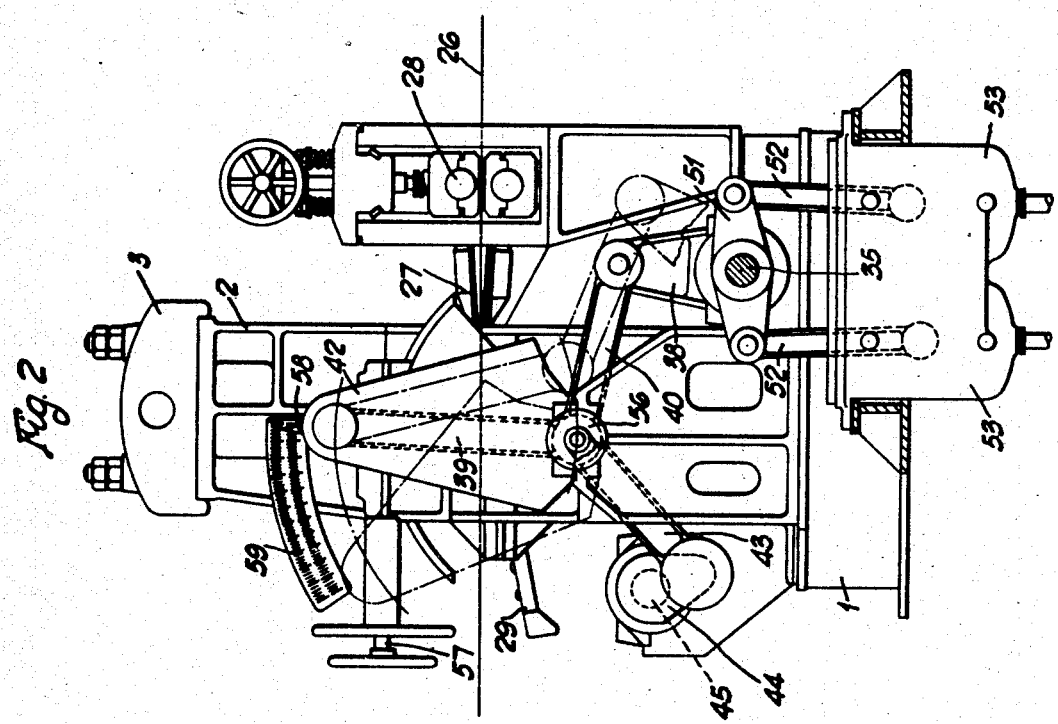

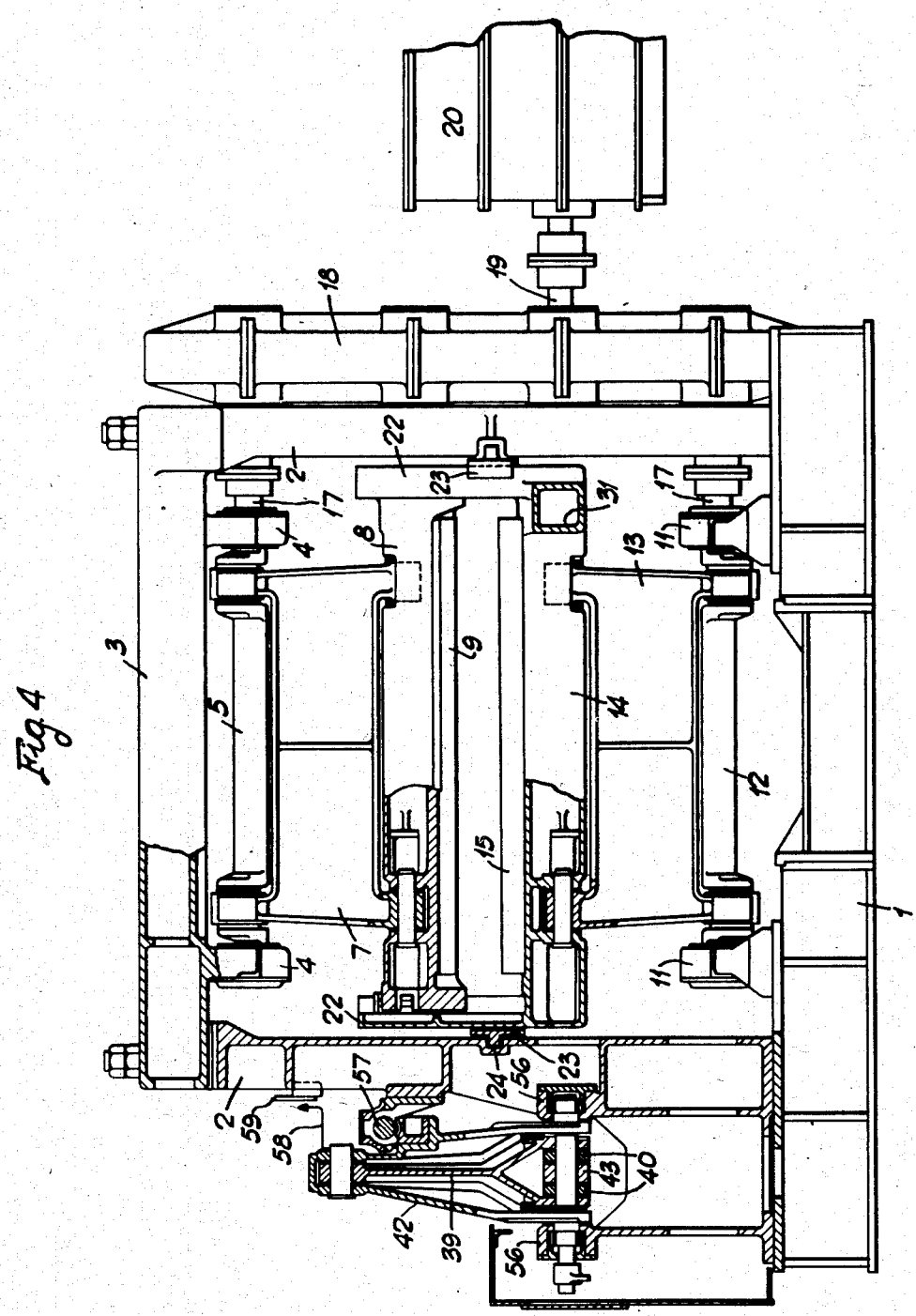

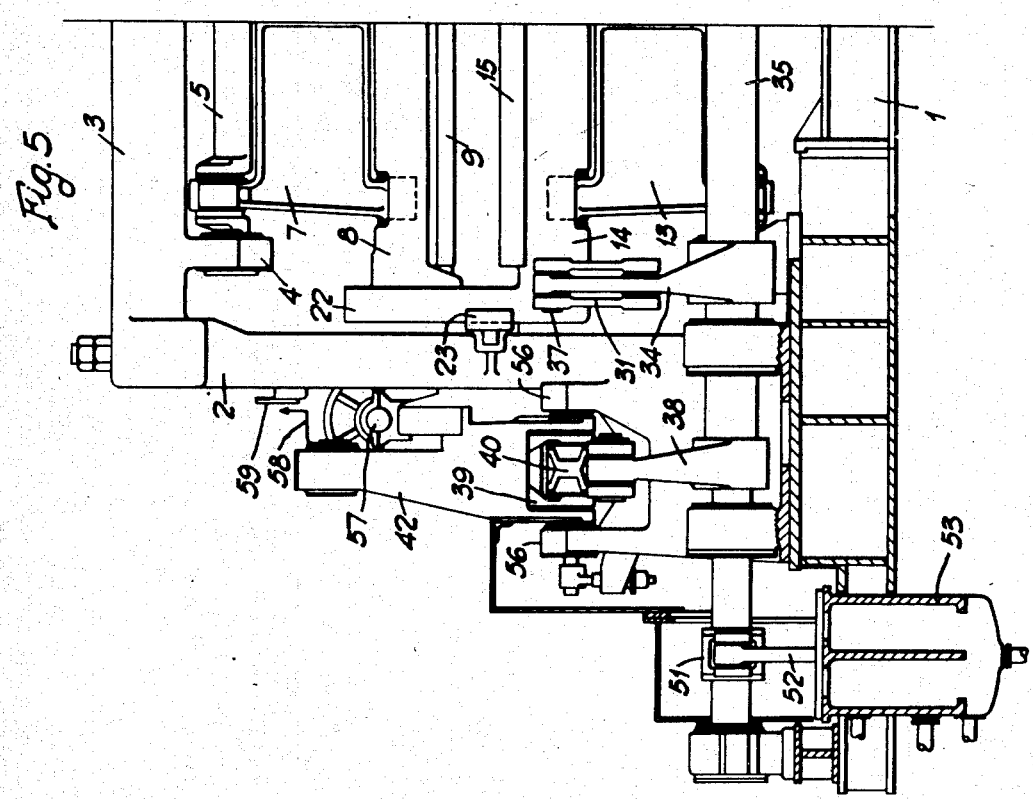

Patented Oct. 7, 1941

2,258,339

UNITED STATES PATENT OFFICE 2,258,339

RECIPROCATING SHEAR

Maurice P. Sieger, Pittsburgh, Pa., assignor to United Engineering and Foundry Company, Pittsburgh, Pa., a corporation of Pennsylvania Application August 3, 1940, Serial No. 350,361

8 Claims. (Cl. 164—49)

This invention relates to an adjustable drive, and more particularly to such a drive for use in a flying shear for oscillating the blade carriers thereof. It is an improvement upon the disclosure of Patent No. 1,973,515 to Howard H. Talbot.

In flying shears of the character disclosed herein and in the Talbot patent, reciprocating blades are mounted on blade carriers which are oscillated to swing the blades forward with the strip material passing between them at a speed at the time of each cut equal to the speed of the strip. When the speed of the strip or of the blade carriers is changed in order to change the length of the sheets cut from the strip, forward movement of the blades should be varied to keep them moving at the same speed as the strip at the time of the cut. My invention relates to the adjustable drive by which the blade carriers can be oscillated in the desired manner, but it is not limited to flying shears as it can be used wherever such a drive is needed.

It is among the objects of this invention to provide an adjustable drive of relatively simple construction which is adapted to reciprocate or oscillate a member in paths of various lengths, which is especially suitable for oscillating the blade carriers of a flying shear, and which is capable of moving flying shear blades at the same speed as the strip during each cut regardless of the time elapsing between cuts.

In accordance with this invention a toggle joint is pivotally connected at one end to an adjustable support, and its opposite end is adapted to be operatively connected to driven means, such, for example, as the oscillatable blade carriers of a flying shear. Means is connected to the toggle for periodically moving it toward and away from straightened position in order to move or swing the driven means back and forth. In the case of blade carriers, they are swung forward with the strip during each cut. If the speed of either the strip or the toggle moving means is changed, so as to vary the length of the sheets cut from the strip, the adjustable support connected to one end of the toggle is adjusted to another position in order to change the distance traveled by the opposite end of the toggle. This alters the linear speed of the blades and makes it possible to synchronize it with the speed of the strip at the time of each cut.

It is a feature of this invention that the speed-adjusting means is not only accurate, but is of such construction that it may be incorporated into heavy-duty shears so that the difficulties encountered heretofore in securing proper synchronization of the speed of the blades with that of the strip at the time a cut is made are eliminated. Since toggle mechanism proposed heretofore for use in flying shears has been of such a design that shocks due to heavy loading usually result in failure of the parts, its use has been limited to shears operating upon light material only. This invention lends itself to compactness in that complicated adjusting mechanism is eliminated by providing an adjustment for one of the pivotal supports so that a construction is obtained which is quite sturdy. Then, too, the adjusting device is conveniently located so that the adjustments may be made quickly, while the shear is in operation if desired, and the new positions readily ascertained.

The preferred embodiment of the invention is illustrated in the accompanying drawings in which Fig. 1 is a plan view, partly in section, of a flying shear incorporating my invention; Fig. 2 is an end view thereof; Fig. 3 is a vertical cross section taken on the line III—III of Fig. 1; Fig. 4 is a longitudinal section taken on the line IV—IV of Fig. 1; and Fig. 5 is a fragmentary longitudinal section taken on the line V—V of Fig. 1.

Referring to the drawings, mounted on a bed plate 1 are a pair of upright end members 2 which are connected at their tops by a horizontal beam 3 provided with depending bearings 4 in which the opposite ends of a crank shaft 5 are journaled. This shaft supports a blade carrier comprising an upper yoke 7 pivotally connected at its bottom to a head 8 to which a shear blade 9 is detachably connected. Mounted on bed plate 1 is a pair of laterally spaced bearings 11 in which the opposite ends of a crank shaft 12 are journaled. This shaft is pivotally connected to the lower end of a yoke 13 whose upper end is pivotally supported to a blade head 14 that carries the lower shear blade 15. The two crank shafts are driven from one end by short shafts 17 projecting from a gear box 18 to which power is supplied through a shaft 19 from a variable speed power unit 20 which for the purpose may be of the type disclosed in Patent Number 1,852,282 issued to Mr. F. C. Biggert, Jr. for Rotary flying shear mechanism. As the crank shafts revolve they reciprocate the shear blades toward and away from each other. The blades are guided in their vertical movements by upright channels 22 integrally connected to the opposite ends of the lower head 14 and in which the opposite ends of the upper head 8 slide.

These channels in turn slide up and down in shoes 23 that are slidable laterally in slots 24 extending across the end members 2 of the shear.

As shown in Fig. 3, strip material 26 is fed continuously between the shear blades from guides 27 leading from either pinch rolls 28, a roller leveler or other apparatus, and as the blades are moved together by crank shafts 5 and 12 they shear the strip into sheets which move away from the table over a delivery plate 29. In order to prevent the blades from causing the forwardly moving strip to buckle behind them during each cut, they must travel along with the strip during the cut. For this purpose the blade carriers, including the blade heads and the knives carried thereby, are oscillated or swung back and forth in the line of travel of the strip so that they will travel forward with the strip during each cut. In accordance with this invention this oscillation is effected in the following manner.

Projecting rearwardly from the opposite ends of the lower blade head is a pair of links 31 integrally connected thereto, as shown in Figs. 1, 3 and 5. Each link has a bifurcated downwardly extending rear end provided with a pair of vertically spaced openings 32 and 33 therethrough. The bifurcated portion of the link receives or straddles a rocker arm 34 projecting upwardly from a rocker shaft 35. This arm is provided with a pair of openings that register with openings 32 and 33 in the link when the arm is upright and the blades are in cut-off position, as shown in Fig. 3. A pivot pin 37 extends through one of the openings in the link and the corresponding opening in the arm. The openings used for this purpose depend upon the speed of the strip, the upper openings being used in cutting long lengths when the strip is moving fast, and the lower openings in cutting short lengths when the strip is moving more slowly.

The rocker shaft is rocked, in order to swing the blades, by means of a lever 38 projecting radially therefrom (Figs. 1, 2 and 5) and, in accordance with this invention, pivotally connected at its outer end to one end of a toggle joint comprising a pair of links 39 and 40 (Fig. 2) that are pivoted together at their inner ends. The opposite end of the toggle joint, which is the outer end of link 39, is pivotally connected to the upper end of a supporting member 42 that will be referred to in more detail later. The toggle is periodically moved toward and away from straightened position by a link 43 pivotally connecting the inner ends of the toggle links to a crank 44. This crank is mounted on one end of a shaft 45 that extends across the shear beneath delivery plate 29 and that is driven from its opposite end by a gear 46 and a pinion 47 from a shaft 48 (Fig. 1) connected to the power unit 20. As the crank revolves and causes link 43 to periodically move the inner ends of the toggle links toward and away from axially aligned position, lever 38 connected to the toggle oscillates the rocker shaft which thereby, through rocker arm 34, swings the blade carriers back and forth. The vertical reciprocation of the blades and their horizontal oscillation are synchronized in power unit 20 so that the blades pass each other in a cutting movement every time their carriers pass through vertical position, as shown in Fig. 3, unless a miss-cut mechanism is used. To dampen shock at the end of each stroke the outer end of rocker shaft 35 carries a cross arm 51 (Fig. 2) to the opposite ends of which are connected pistons 52 that operate in dash pots 53.

It will be understood from the disclosure thus far that every time crank 44 and link 43 move the toggle away from straightened position, toggle link 40 swings lever 38 forward and thereby the blades are swung forward in the direction of travel of the strip. As previously mentioned, to avoid buckling or tearing of the strip during cutting, the blades should move forward at the same speed as the strip during each cut. It is a feature of this invention that this is accomplished regardless of the frequency of the cuts; in other words, regardless of the length of the sheets being cut from the strip. It is done by controlling the length of the arc or stroke through which the blades are swung relative to the speed of rotation of crank 44. Thus, if the blades are swung farther when the crank is turning more slowly for longer sheets, the blades will have a faster linear speed than if they were traveling in the same short arc as before. By proper regulation this linear speed of the blades at the time of the cut can be maintained the same as the speed of the strip.

Accordingly, the lower end of supporting member 42, which is bifurcated, is pivotally mounted in bearings 56 on a horizontal axis in line with the center pivot of the toggle when the latter is in center or cut-off position; that is, when the blade carriers are in vertical position. The upper end of toggle support 42 is adjustable around its pivot by a manually operable adjusting screw 57 operatively connected to the back of the support. When this screw is turned to adjust support 42 from right to left, as viewed in Fig. 2, the arc in which the center pivot of the toggle oscillates tilts toward the vertical. As a result, the outer end of toggle link 40 has a shorter stroke than before and therefore the oscillating or linear speed of the blades is decreased. This decrease in speed is necessary because support 42 is not adjusted toward the left unless the drive for crank 44 has been speeded up in order to cut the strip into shorter lengths. Without the toggle adjustment the oscillating speed of the blades would be increased correspondingly and they would move faster than the strip and tear it during the cut.

If, on the other hand, longer lengths are desired, the frequency of the cuts is decreased by slowing down the drive for crank 44 the necessary amount. This would tend to likewise slow down the blade oscillations which would cause buckling of the strip during the cuts. However, buckling is prevented by adjusting toggle support 42 to the right so that the outer end of link 40 will have a longer stroke. As the blades must travel a longer arc than before the toggle adjustment was made, but in the same period of time, their linear speed is increased.

It will be clear that in this manner the linear speed of the blades can be controlled by the toggle so that it will always equal the speed of the strip at the time of cutting. To facilitate synchronizing of the blade and strip speeds for different lengths of sheets being cut from the strip, the upper end of toggle support 42 is provided with a pointer 58 that cooperates with a scale 59 attached to the adjacent end member 2 of the shear. This scale is so calibrated that the figure opposite (not shown) the pointer at any point on the scale indicates the length of sheets for which the linear speed of the blades is synchronized with the strip speed when sheets of that particular length are being cut. Thus, if the crank drive is set for cutting thirty-inch sheets, support 42 is adjusted until its pointer points to the thirty-inch designation on the scale. The blade and strip speeds are then known to be synchronized.

To give a wide range of permissible sheet lengths the scale has an upper and a lower row of calibrations, the upper row being used when pin 37 is in upper hole 32 of link 31, and the lower row read when the pin is in lower hole 33. For example, the upper row of calibrations may represent sheets from 45 to 90 inches long when the strip is traveling not more than 400 feet per minute, while the lower row may indicate lengths of from 22½ to 45 inches for a maximum strip speed of 150 feet per minute.

According to the provisions of the patent statutes, I have explained the principle and mode of operation of my invention and have illustrated and described what I now consider to represent its best embodiments. However, I desire to have it understood that, within the scope of the appended claims, the invention may be practiced otherwise than as specifically illustrated and described.

I claim:

1. A flying shear comprising a pair of oscillatable blade carriers, blades mounted thereon, means for reciprocating the blades to cut strip material passing between them, a toggle joint, an adjustable support pivotally connected to one end of said toggle, means operatively connecting the opposite end of said toggle to said blade carriers, means for periodically moving said toggle toward and away from straightened position to swing said carriers in the direction of movement of the strip during each cut, and means for adjusting said support to change the distance traveled by said opposite end of the toggle whereby to change the linear speed of the blades for synchronizing it with the speed of the strip at the time of each cut.

2. A flying shear comprising a pair of oscillatable blade carriers, blades mounted thereon, means for reciprocating the blades to cut strip material passing between them at a uniform speed, a toggle joint, an adjustable support pivotally connected to one end of said toggle, means operatively connecting the opposite end of said toggle to said blade carriers, means for periodically moving said toggle toward and away from straightened position at a predetermined speed to swing said carriers in the direction of movement of the strip during each cut, means for changing said speed of the toggle-moving means to change the frequency of the cuts, and means for adjusting said support to change the distance traveled by said opposite end of the toggle whereby to change the linear speed of the blades for synchronizing it with the speed of the strip at the time of each cut.

3. A flying shear comprising a pair of oscillatable blade carriers, blades mounted thereon, means for reciprocating the blades to cut strip material passing between them at a uniform speed, a toggle joint, an adjustable support pivotally connected to one end of said toggle, means operatively connecting the opposite end of said toggle to said blade carriers, means for periodically moving said toggle toward and away from straightened position at a predetermined speed to swing said carriers in the direction of movement of the strip during each cut, means for changing one of said speeds to change the distance between cuts, means for adjusting said support to change the distance traveled by said opposite end of the toggle whereby to change the linear speed of the blades for synchronizing it with the speed of the strip at the time of each cut, a pointer carried by said adjustable support, and a dial cooperating with the pointer and calibrated to show the correct location of said support for synchronization of said speeds for any desired lengths of material cut from the strip.

4. A flying shear comprising a pair of oscillatable blade carriers, blades mounted thereon, means for reciprocating the blades to cut strip material passing between them, a toggle joint, an adjustable support pivotally connected to one end of said toggle, a rocker arm operably connected to the opposite end of said toggle and provided with a plurality of longitudinally spaced openings, a link operatively connected to said blade carriers, means for pivotally connecting said link to any one of said openings in said arm, means for periodically moving said toggle toward and away from straightened position to swing said carriers in the direction of movement of the strip during each cut, and means for adjusting said support to vary the amplitude of movement of said rocker arm whereby to change the linear speed of the blades for synchronizing it with the speed of the strip at the time of each cut.

5. A flying shear comprising a pair of oscillatable blade carriers, blades mounted thereon, means for reciprocating the blades to cut strip material passing between them, a pair of links pivoted together at their inner ends to form a toggle, an adjustable support pivotally connected to the outer end of one of said links, means operatively connecting the outer end of the other link to said blade carriers, means pivotally connected to said inner ends of the links for moving the links toward and away from longitudinally aligned position at a predetermined speed to swing said carriers in the direction of movement of the strip during each cut, and means for adjusting said support in an arc of a circle concentric with said pivoted inner ends of the links when said blade carriers are in cut-off position, whereby to change the linear speed of the blades for synchronizing it with the speed of the strip at the time of each cut.

6. A flying shear comprising a pair of oscillatable blade carriers, blades mounted thereon, means for reciprocating the blades to cut strip material passing between them, a pair of links pivoted together at their inner ends to form a toggle, a supporting member, means pivotally connecting the outer end of one of the links to said member, means operatively connecting the outer end of the other link to said blade carriers, means pivotally supporting said member on an axis in line with the axis of said pivoted ends when said blade carriers are in cut-off position, means pivotally connected to said inner ends of the links for moving the links toward and away from longitudinally aligned position at a predetermined speed to swing said carriers in the direction of movement of the strip during each cut, and means for adjusting said supporting member around its axis to change the distance traveled by the outer end of said other link whereby to change the linear speed of the blades for synchronizing it with the speed of the strip at the time of each cut.

7. An adjustable drive comprising a toggle joint, an adjustable support pivotally connected to one end of said toggle, driven means operatively connected to the opposite end of said toggle, driving means for periodically moving said toggle toward and away from straightened position to move said driven means back and forth, and means for adjusting said support to change the distance traveled by said opposite end of the toggle whereby to change the linear speed of said driven means.

8. An adjustable drive comprising a toggle joint, an adjustable support pivotally connected to one end of said toggle, driven means operatively connected to the opposite end of said toggle, damping means operatively connected to said driven means, driving means for periodically moving said toggle toward and away from the straightened position to move said driven means back and forth, and means for adjusting said support to change the distance traveled by said opposite end of the toggle whereby to change the linear speed of said driven means.

MAURICE P. SIEGER.